United States Patent [19]

von Allworden

[11] 4,157,019
[45] Jun. 5, 1979

[54] RELEASABLE COUPLING DEVICE FOR A POWER TRANSMISSION SHAFT

[75] Inventor: Wilhelm von Allwörden, Erbach, Fed. Rep. of Germany

[73] Assignee: Jean Walterscheid GmbH, Lohmar, Fed. Rep. of Germany

[21] Appl. No.: 836,705

[22] Filed: Sep. 26, 1977

[30] Foreign Application Priority Data

Sep. 25, 1976 [DE] Fed. Rep. of Germany ....... 2643323

[51] Int. Cl.² .............................................. F16C 1/06
[52] U.S. Cl. ........................................ 64/4; 403/314; 64/1 C
[58] Field of Search ................. 285/312, 316, 277; 64/18, 9 R, 1 C, 4; 403/322, 325, 359, 314; 137/316.06

[56] References Cited

U.S. PATENT DOCUMENTS

| | | | |
|---|---|---|---|
| 2,885,232 | 2/1958 | Eberly | 403/359 |
| 3,155,402 | 11/1964 | Cornelius | 285/277 |
| 3,300,235 | 2/1967 | Backwell | 403/314 |
| 3,357,206 | 12/1967 | Christie | 64/4 |
| 3,664,375 | 5/1972 | Marette | 137/614.06 |
| 3,966,239 | 6/1976 | Heckenkamp | 285/316 |

FOREIGN PATENT DOCUMENTS 569900 6/1945 United Kingdom .................... 403/325

*Primary Examiner*—Samuel Scott
*Assistant Examiner*—George Anderson
*Attorney, Agent, or Firm*—Edmund M. Jaskiewicz

[57] ABSTRACT

A coupling device for making a driving connection between a tractor power take-off shaft and a transmission shaft on an implement towed by the tractor has a coupling hub drivingly mounted on the power take-off shaft and a coupling drum coaxially surrounding the coupling hub and substantially fixed with respect to the tractor. A coupling sleeve on a power transmission shaft is detachably connected to the coupling hub by a quick-release fastener means which includes a spring-biased locking ring. A release lever is pivotally mounted on a fixed pivot on the drum and an actuating lever is pivotally connected to the release lever spaced from the fixed pivot. Pivotal movement of the actuating lever will pivot the release lever about its fixed pivot so that the release lever engages the locking ring to release the fastener means and thereby disengaging the sleeve from the hub. Further pivotal movement of the actuating lever causes the actuating lever to pivot about a stop on the drum such that the actuating lever engages a stop on the sleeve to push the disengaged sleeve from the hub.

6 Claims, 5 Drawing Figures

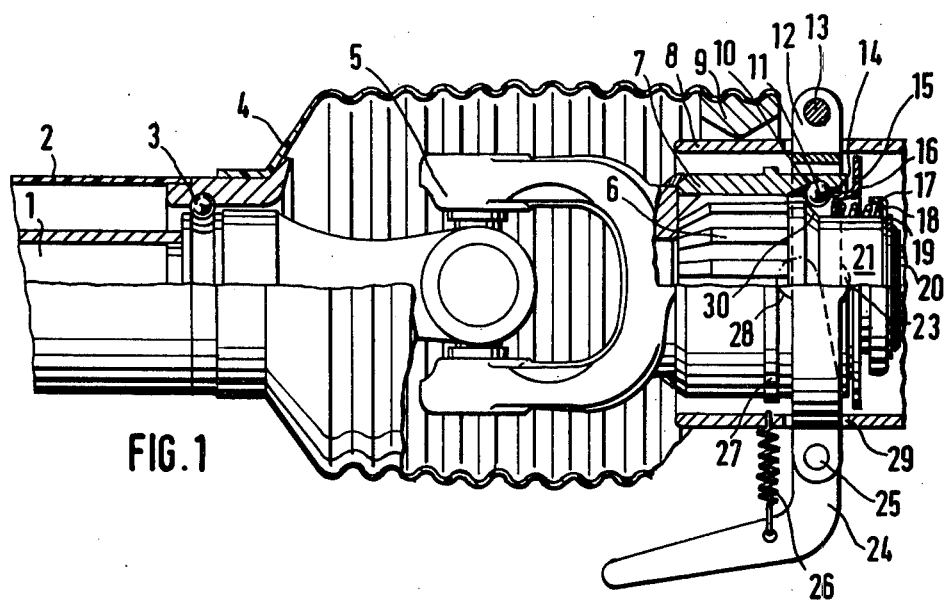
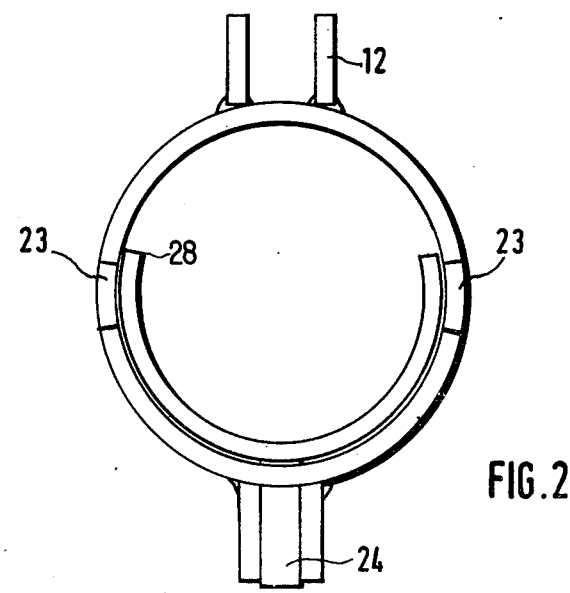

RELEASABLE COUPLING DEVICE FOR A POWER TRANSMISSION SHAFT

The present invention relates to a quick coupling device for making a driving connection between two shafts, more particularly, to the structure for disengaging such a coupling device between the power take-off shaft of a tractor and a transmission shaft of an agricultural machine.

Various forms of quick coupling devices have been provided for making a driving connection between the power take-off shaft of a tractor and the power transmission shaft of an agricultural machine or implement which is to be towed by the tractor. Such a coupling device generally comprises interengaging coupling members one of which is a coupling hub having external splines engagable with the internal spines of a coupling sleeve and the coupling members are held in engagement by a quick-release snap fastener.

One such form of a coupling device is disclosed in applicant's copending U.S. patent application, Ser. No. 716 835, filed Aug. 23, 1976. In this coupling device a coupling drum is non-rotatably mounted on the tractor and a coupling hub mounted on the tractor power take-off shaft is journalled within the drum. A coupling sleeve mounted on the transmission shaft of the agricultural implement is positioned between the hub and the drum and is detachably coupled to the hub by means by a quick-release fastener device having balls retained in locking engagement by a spring-loaded locking ring. The hub is also mounted on the power take-off shaft by a quick-release fastener device having a ball retaining mechanism which includes a spring-loaded tubular sleeve. An actuating member is pivotally mounted on a support fixed on the outer surface of the coupling drum and has a first arm connected to the coupling sleeve and a second arm which functions as an operating lever such that pivoting of the operating lever will effect relative movement of the coupling sleeve and coupling hub wherein the sleeve will be moved to a position coaxially between the hub and the drum into driving engagement with the hub.

The quick-release fastener device between the sleeve and the hub has a spring-loaded locking ring which maintains a plurality of balls in operatively engaged position. The locking ring is axially moved out of this locking position by an annular actuating part or actuating ring which acts in opposition to the loading of the spring. The actuating ring is in turn actuated by the manually operated lever. Subsequently, the coupling sleeve together with the associated universal joint shaft and protective boot may be pulled off of the hub member with the aid of a coupling lever.

This described known coupling device has the disadvantage in that the sleeve must first be disengaged from the hub and the sleeve then removed from the hub by two distinct and separate operations. Further, the different components required for the uncoupling and disengaging operation are numerous and sometimes present difficulties in operation.

It is therefore the principal object of the present invention to provide an improved coupling device for coupling the power take-off shaft of a tractor to the transmission shaft of an agricultural implement or machine towed by the tractor.

It is another object of the present invention to provide such a coupling device which is safe and reliable in operation and simple in construction.

It is a further object of the present invention to provide such a coupling device which is simply operated by actuation of a single actuating lever in the same direction of movement to perform successive stages of disengagement and uncoupling.

According to one aspect of the present invention a device for releaseably coupling a power take-off shaft of a tractor to a transmission shaft of an agricultural implement or the like may comprise a coupling hub drivingly mounted on the power take-off shaft. A coupling drum which is substantially fixed relative to the tractor coaxially surrounds and is spaced from the hub. A coupling sleeve is mounted on the transmission shaft and is connected in driving engagement with the coupling hub by a quick-release fastener means including a spring-biased locking ring. A release lever is pivotally mounted on a fixed pivot on the drum and has a portion engageable with the locking ring. An actuating lever is pivotally connected to the release lever at a point which is spaced from the fixed pivot point and has an arm which is engageable with a first stop on the drum. Pivoting of the actuating lever will pivot the release lever about its fixed pivot so that the release lever will engage the locking ring to release the fastener means and thus disengage the sleeve from the hub. Further pivoting movement of the actuating lever will pivot the actuating lever about the first stop on the drum so that an arm of the actuating lever will engage a second stop on the coupling sleeve to push the disengaged sleeve from the hub.

The releasable coupling device according to the present invention has the definite advantage of requiring actuation either by hand or by a pedal of only a single actuating lever in only one and the same direction of lever movement in order to perform successive operations of disengaging the quick-release fastener means and subsequently detaching the coupling sleeve from the hub member. As a further result of this coupling device, the uncoupling process will be greatly facilitated and can be quickly carried out even under those conditions wherein the universal joint shaft associated with an agricultural machine which has been lowered to the ground bears with its entire weight upon the coupling. There will be no need for the operator to reach into the interior of the coupling.

The coupling device can be further provided with a spring to retract the actuating lever into its initial position after the coupling sleeve has been detached so that the coupling is ready for the next operation.

Other objects and advantages of the present invention will be apparent upon reference to the accompanying description when taken in conjunction with the following drawings, which are exemplary, wherein;

FIG. 1 is side elevational view partially in section, of the coupling device according to the present invention having a manually operated actuating lever;

FIG. 2 is an end view of the actuating and release levers in the coupling device of FIG. 1;

Proceeding next to the drawings wherein like reference symbols indicate the same parts throughout the various views a specific embodiment and modifications of the present invention will be described in detail.

Figure 3:
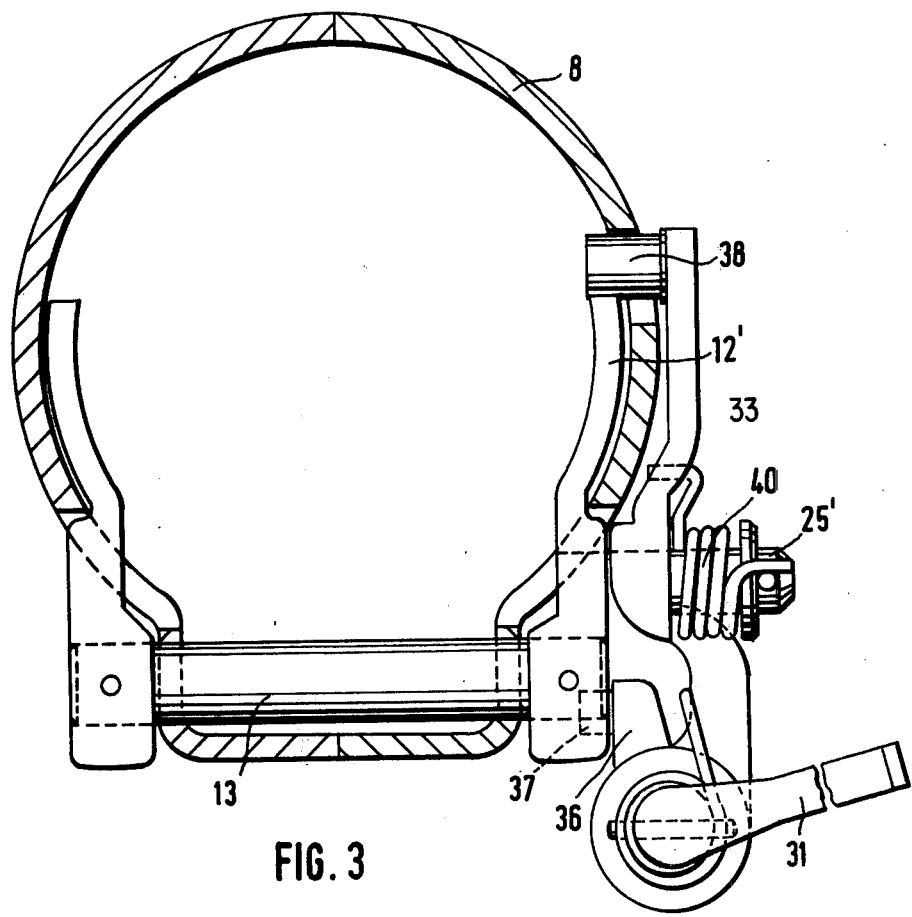
FIG. 3 is a view similar to that of FIG. 2 but showing a modification of the coupling device adapted for operation by a pedal and having a locking mechanism to prevent accidental disengagement.

As may be seen in FIG. 1, a cardan or universal joint shaft 1 is enclosed by a tubular guard element 2 journalled on ball bearings 3. A flexible protective boot of the bellows type which is known in the art and indicated at 4 is attached to the end of the tubular guard 2 and extends outwardly therefrom to cover a universal joint 5. Attached to the universal joint 5 is an internally splined coupling sleeve 7 which meshes in driving engagement with a correspondingly externally splined coupling hub 6 axially fixed on a power take-off shaft 20 of the tractor. The open end of the boot 4 also extends over a coupling drum 8 which is mounted upon the tractor. The open end of the boot 4 is provided with a guide ring 9 having a semi-circular cross-sectional configuration to provide axial guidance and support for the coupling sleeve 7 with respect to the coupling hub 6 particularly during initial engagement of these parts during the coupling operation. This structure is advantageous in that the hub and sleeve members of the coupling are concealed in a coupling operation which essentially comprises pushing the protective boot 4 over the coupling drum 8.

The internally splined coupling sleeve 7 has a conical extension 14 and has an internal annular groove 10 to receive locking balls 11 of a quick-release fastener device. The groove 10 together with an inclined annular face 30 on the coupling hub 6 defines a recess for receiving the balls 11. The hub 6 has an extension 21 upon which is guided ring 16 in which are recesses to retain the balls 11. The recesses have a diameter smaller than that of the balls to retain the balls against falling outwardly. The locking ring 16 has a lock release surface 15 and is maintained in its operative or locking position by a spring 17 one end of which bears against tabs on the ring 16 and the other end of which bears against an end ring 18 which is retained by axial securing means 19 on the end of the hub extension 21.

The inclined face 30 on the coupling hub 6 is directed toward the tractor and next to the inclined face 30 is the extension 21 of the hub which also supports the end ring 18. An annular shoulder or ejector ring 27 is provided on the outer peripheral surface of the coupling sleeve 7 and is positioned to take up axial thrust in the direction toward the cardan shaft 1.

An annular release lever 12 is positioned within hub 8 and surrounding the sleeve and has a first portion extending upwardly through an opening in drum 8 to be mounted pivotally on a fixed pivot bearing 13 located on the outer peripheral surface of the coupling drum 8. The release 12 is pivotally connected by a pin 25 with an actuating lever 24 at a point which is substantially diametrically opposed from the fixed pivot 13. An annular face of the release lever 12 is provided with a pair of oppositely disposed cams or lobes 23 directed toward the lock-release surface 15 on the locking ring 16. A spring 26 is connected between the drum 8 and actuating lever 24 to retain the lever 24 in its initial or neutral position or to return the actuating lever to this position after a lock release operation.

The drum 8 is provided on its lower portion with an opening through which extends a second portion of the release lever 12 and actuating lever 24. An edge of the opening forms a stop or abutment 29 which will be engaged by the actuating lever 24.

Release of the coupling device of the present invention involves two separate successively executed phases or stages of movement during which the actuating lever 24 travels in the same direction for both phases. To release the coupling device the actuating lever 24 is pivoted manually in a counterclockwise direction. This pivoting movement causes an upper end or arm 28 to abut against the annular ejector ring 27 such that the ring 27 acts as a fixed point about which the actuating lever 24 pivots since the coupling sleeve 7 is still in locking engagement with the coupling hub 6. Consequently, pivoting of the actuating lever 24 will transmit the applied force to pivot pin 25 and thus to release lever 12 which then pivots about its fixed pivot 13 in such a manner that the cams 23 engage the lock release surface 15. This will cause locking ring 16 to slide axially in opposition to the force of spring 17 out of its operative locking position so as to release the balls 11 from the groove 10 and thus disengage the coupling sleeve 7 from hub 6.

Continuing pivoting movement of the actuating lever 24 will initiate the second phase wherein the lever 24 engages stop 29 which acts as a fixed stop during this second phase. Pivoting of the actuating lever 24 about the fixed stop 29 will cause the arm 28 to push against ejector ring 27 and thus push the disengaged coupling sleeve 7 off from the coupling hub 6. This completes the uncoupling process and the spring 26 will then retract the actuating lever 24 to its initial or neutral position as shown in FIG. 1 and the coupling device is then ready for the next coupling operation.

Figure 4:
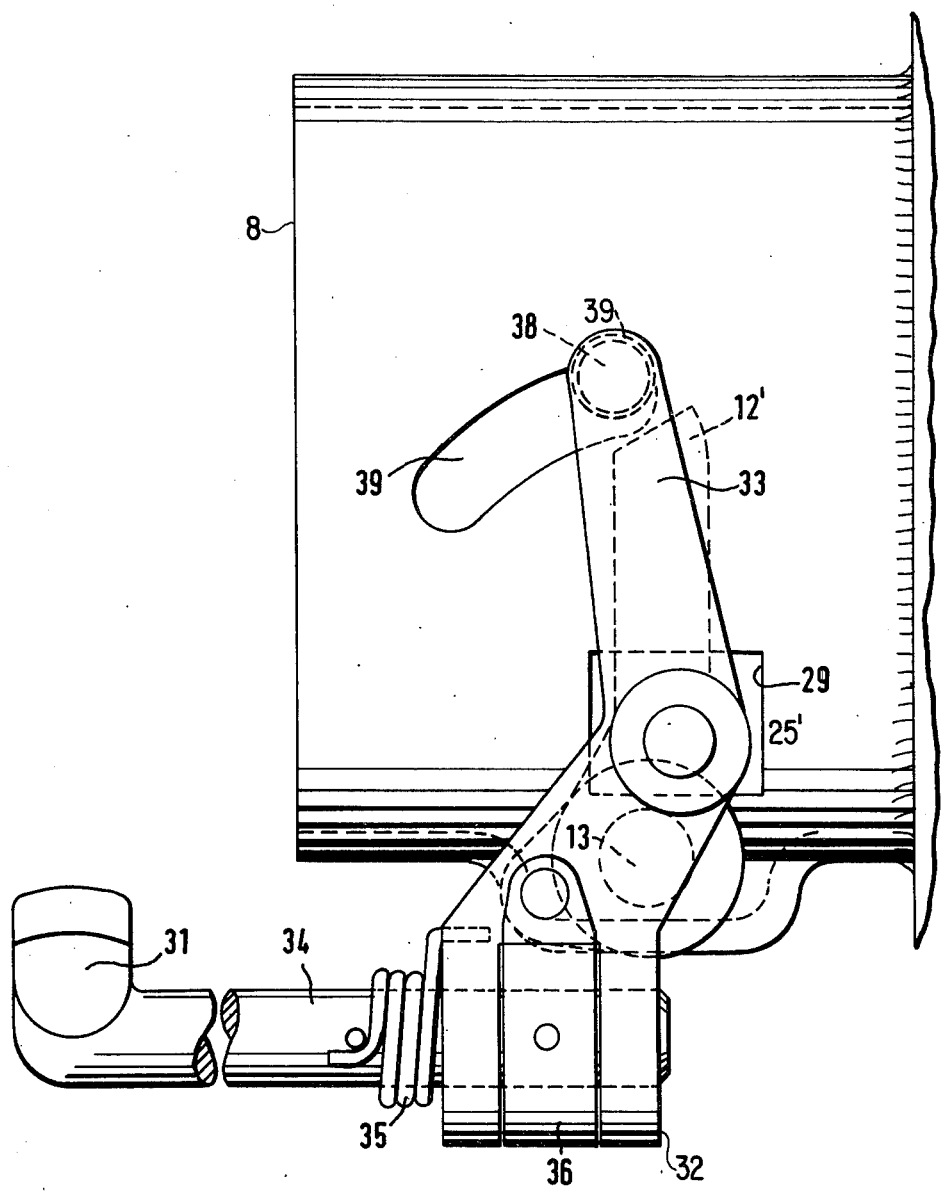
FIG. 4 is a side elevational view of the modification of FIG. 3 illustrating the components in the initial position.
Figure 5:
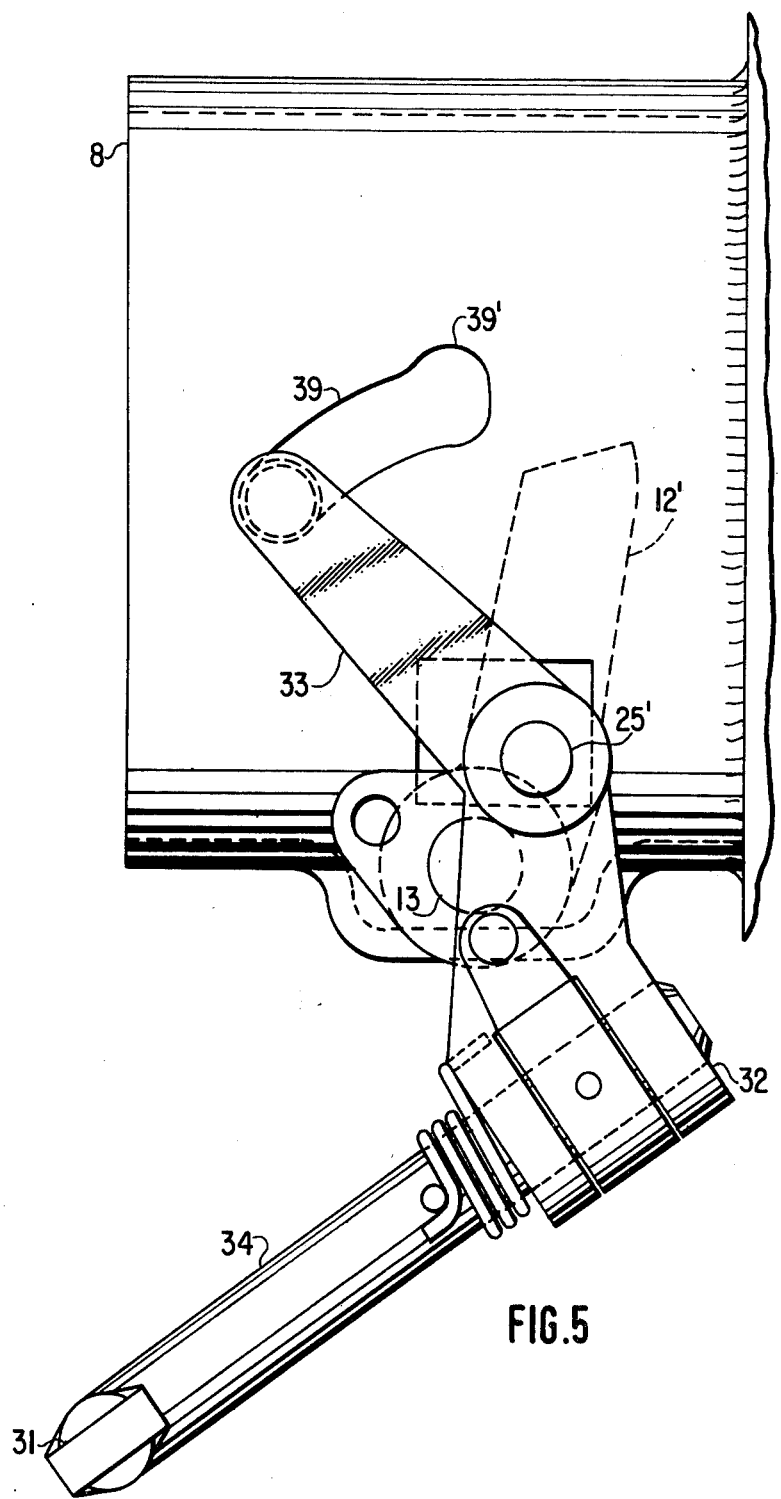
FIG. 5 is a view similar to that of FIG. 4 but showing the components in their actuated positions.

In FIGS. 3-5 there is illustrated a modification of the coupling device having a pedal operated lock release mechanism and wherein the release lever is of a bi-furcated shape.

The lock release mechanism of FIGS. 3-5 is essentially similar to the above-described structure. This modification utilizes a release lever 12' which is bi-furcated and is pivotally mounted on a fixed pivot 13 comprising a pin mounted on the drum 8. At a point on the release lever 12' spaced from pivot 13 there is mounted a pin 25' upon which is pivotally connected actuating lever 33. The lower end of actuating lever 33 is provided with a bearing 32 in which is received an end of pedal lever 34. A pedal 31 is attached on the outer end of lever 34 and extends transversely thereto. The pedal lever 34 is biased in a counterclockwise direction by a spring 35 and non-rotatably mounted on the inner end of the brake lever 34 between the twin portions of the bearing 32 is a safety cam 36 on the upper end of which extends a safety bolt 37.

The upper end of the actuating lever 33 is provided with a guide pin 38 which is received within a guiding or controlling slot 39 formed in the drum 8. On the end of the slot 39 facing toward the tractor there is a widened or slotted portion 39' which functions as a socket or retaining recess for receiving the guide pin 38. The actuating lever 33 is retained in its initial or normal position as shown in FIG. 4 wherein guide pin 38 is in recess 39' under the action of a spring 40 mounted on the pin 25'.

In order to release the coupling device of FIGS. 3-5, a force must first be applied to the pedal 31 so that the pedal lever 34 together with safety cam 36 is pivoted in bearing 32 to disengage the safety bolt 37. The pedal lever 34 is then pivoted downwardly or counterclockwise as viewed in FIG. 4 to cause the actuating lever 33 in the first phase to pivot about the center of its guide pin 38 which is seated in recess 39'. The pivoting of actuating lever 33 will cause release lever 12' to pivot about its fixed pivot 13 so that the upper end of release lever 12' will engage lock release surface 15 on locking ring 16 to push the locking ring 16 axially in opposition to the force of spring 17 so that the ring 16 is moved from its locking position.

Near the end of this first operating phase the release lever 12' will engage the abutment or stop edge 29. During the first phase of operation the center of the pin 25 has moved along an arcuate path around the center of the pivot bearing 13. Accordingly, the guide pin 38 will be pulled out of the recess 39' and thus become freely movable in the slot 39.

During the second phase the actuating lever 33 will pivot about the pin 25' which is retained in the position as shown in FIG. 5 and the guide pin 38 will engage the ejector ring 27 to push the coupling sleeve 7 off from the coupling hub member 6.

Upon completion of the uncoupling operation, the pedal 31 is released and the spring 40 will return the release lever 12' and the actuating lever 33 to their respective initial positions and the safety bolt 37 will again become engaged in the position shown in FIG. 3. This engagement of the safety bolt functions as a safety feature to prevent accidental release of the actuating lever and this safety mechanism can also be applied to the embodiment as described in FIG. 1 and 2.

Thus in the modification of FIGS. 3-5, the actuating lever is secured against accidental release of the coupling device by means of the safety bolt which is maintained in its operative locking position by a spring and can be released from this position in opposition to the spring loading by moving the actuating lever in its normal operating direction. As described above, the locking bolt will reengage in its effective locking position when the actuating lever has been returned to its inital position upon completion of the uncoupling operation.

The structure of FIGS. 3-7 can be further modified by providing for the actuating lever 33 to engage and be supported upon the ejector ring 27 during the first operating phase of uncoupling instead of having its pin remaining engaged in the slot 39.

Similarly, either manual or pedal operation may be provided for both disclosed modifications and the safety mechanism also can be applied to either modification.

Thus it can be seen that the present invention has disclosed an uncoupling device which is quickly and easily operated by moving the actuating lever coninuously in the same direction whereby two different functions are performed, namely, disengaging of the coupling sleeve from the coupling hub and then removal or detaching of the coupling sleeve off from the coupling hub.

It will be understood that this invention is susceptible to modification in order to adapt it to different usages and conditions, and accordingly, it is desired to comprehend such modifications within this invention as may fall within the scope of the appended claims.

What is claimed is:

1. A device for releasably coupling a power take-off shaft of a tractor to a transmission shaft of an agricultural implement or the like, comprising a coupling hub drivingly mounted on the power take-off shaft, a coupling drum substantially fixed relative to the tractor and coaxially surrounding and spaced from said hub, a first stop on said drum, a coupling sleeve mounted on said transmission shaft and having a second stop thereon, quick-release fastener means including a spring biased locking ring spaced from said second stop and balls retained by said locking ring for detachably connecting said sleeve in driving engagement with said hub, a release lever pivotally mounted on a fixed pivot on said drum and engageable with said locking ring, an actuating lever pivotally connected to said release lever at a point spaced from said fixed pivot and having an arm engageable with said second stop, pivotal movement of said actuating lever pivots said release lever about its fixed pivot so that the release lever engages the locking ring to release the balls of said fastener means and disengages said sleeve from said hub and further pivoting of said actuating lever about said first stop brings said arm into engagement with said second stop to push the disengaged sleeve from said hub.

2. A device as claimed in claim 1 wherein said release lever comprises an annular member and said pivot point comprises a pin, said actuating lever being pivotally mounted on said pin.

3. A device as claimed in claim 2 wherein said annular member is disposed within said hub and surrounding said sleeve, said fixed pivot being on the outer surface of said drum and said pivot pin being diametrically opposed from said fixed pivot.

4. A device as claimed in claim 3 wherein said first stop comprises an edge of an opening in said drum through which a portion of said annular member extends, said second stop comprising an annular shoulder, there being a cam on said annular member engagable with said locking ring.

5. A device as claimed in claim 1 wherein said release lever comprises a bi-furcated element and said pivot point comprising a pin, said actuating lever being pivotally mounted on said pin.

6. A device as claimed in claim 1 and further comprising a flexible protective boot mounted on said transmission shaft and having an open end extending toward said coupling sleeve, an annular guide having a substantially semi-circular cross-section mounted within said boot open end and engagable with the outer surface of said drum when said transmission shaft is coupled to said power take-off shaft.

* * * * *